United States Patent [19]

Abel

[11] 4,195,733
[45] Apr. 1, 1980

[54] SHIPPING AND STORAGE CONTAINER

[75] Inventor: Allen J. Abel, Roseville, Minn.

[73] Assignee: Minnesota Mining and Manufacturing Company, St. Paul, Minn.

[21] Appl. No.: 929,577

[22] Filed: Jul. 31, 1978

[51] Int. Cl.² .................... G11B 1/02; G11B 25/04; B65D 85/02; B65D 85/30
[52] U.S. Cl. ................................. 206/444; 206/403; 360/133
[58] Field of Search ............... 206/444, 303, 309, 310, 206/403, 404, 405, 406; 346/74 MD; 179/100.2 Z

[56] References Cited

U.S. PATENT DOCUMENTS

| 2,030,465 | 2/1936  | Nist ........................... 206/303 |
| 3,007,702 | 11/1961 | Eby ............................ 206/309 |
| 3,500,364 | 3/1970  | David et al. ............... 206/303 |
| 3,509,992 | 5/1970  | David et al. ............... 206/303 |
| 3,643,240 | 2/1972  | Raiser ........................ 206/303 |
| 3,736,777 | 6/1973  | Wirth ......................... 206/303 |

*Primary Examiner*—William T. Dixson, Jr.
*Attorney, Agent, or Firm*—Cruzan Alexander; Donald M. Sell; William L. Huebsch

[57] ABSTRACT

A shipping and storage container for magnetic recording discs having central openings. The container comprises a base including a cylindrical portion about which the discs may be positioned, spacers to separate discs around the cylindrical portion, a cover for discs around the cylindrical portion and means for releasably attaching the cover to the base.

4 Claims, 4 Drawing Figures

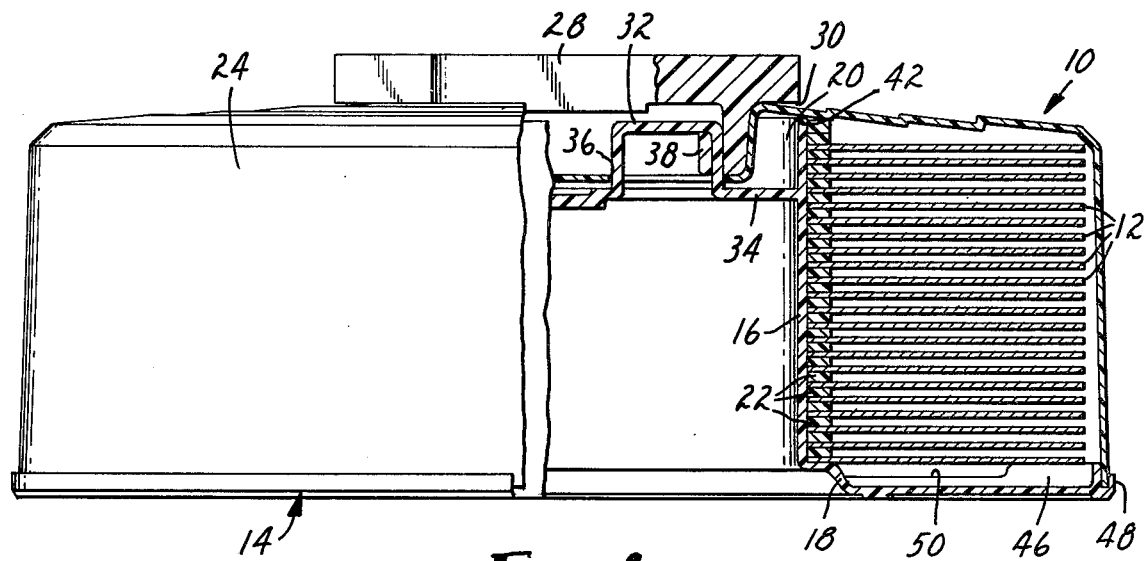
FIG. 1
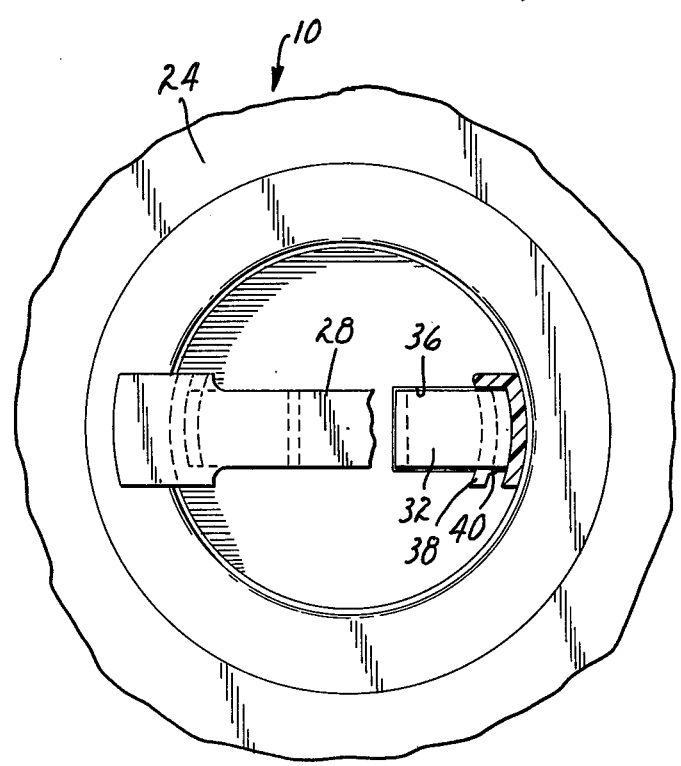
FIG. 2
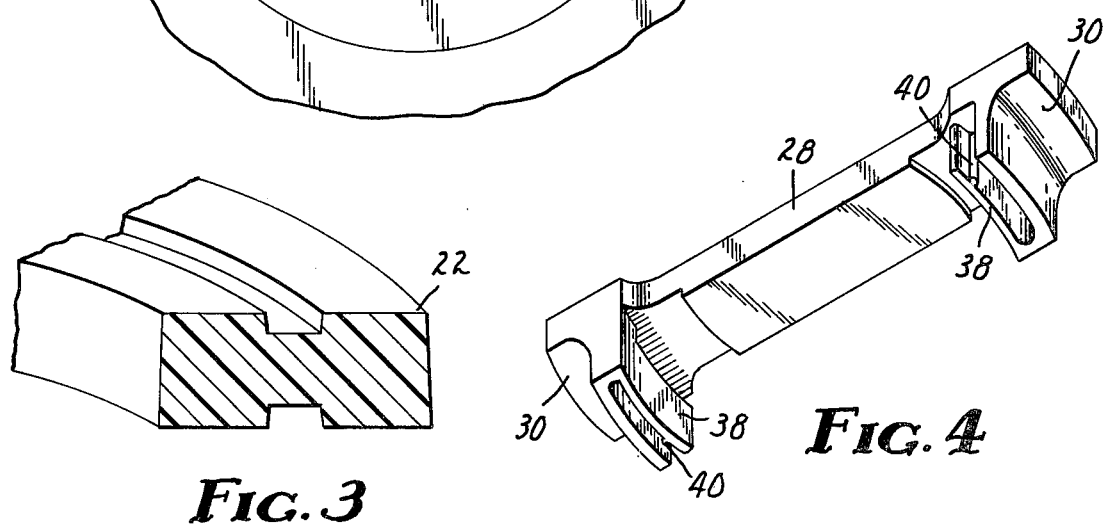
FIG. 3
FIG. 4

SHIPPING AND STORAGE CONTAINER

BACKGROUND OF THE INVENTION

The present invention relates to devices used to support magnetic recording discs during shipment and storage.

While many magnetic recording discs are assembled by their manufacturer into disc-packs adapted to be removably mounted on disc-drives used as peripheral equipment for computers, many other magnetic recording discs are shipped to manufacturers of peripheral equipment to be permanently incorporated in their equipment.

Heretofore, the methods of packing the magnetic recording discs during such shipment has created certain problems for their manufacturer.

One method has been to temporarily assemble the magnetic recording discs into disc-packs using reject or used disc-pack parts. These disc-packs are then packaged and shipped to a peripheral equipment manufacturer, where they must be disassembled so that the recording discs may be incorporated in his equipment. This method is impractical, however, as the number of reject or used disc-pack parts available is usually not sufficient for the number of magnetic recording discs to be shipped, and the disc-packs do not hold the discs in a close spaced relationship and are thus wasteful of shipping space.

Another method has been to pack the recording discs into cardboard containers. Such containers, however do not provide the degree of protection that might be desired, and there is a tendency for the container to shed particles onto the discs which are difficult to remove; particularly from lubricated recording discs where removal of the particles may also remove the lubricating coating.

SUMMARY OF THE INVENTION

The present invention provides a shipping and storage container for a plurality of magnetic recording discs which provides clean concentrated packaging for the recording discs, which does not allow disc to disc contact, and which is reusable, portable, and stackable.

The shipping and storage container according to the present invention comprise a base including an upwardly projecting cylindrical portion having a peripheral surface adapted for close fitting engagement within the opening of magnetic recording discs, and radially extending circular end support wall at a first or bottom end of the cylindrical portion. A second or top end of the cylindrical portion opposite the end support wall is unrestricted to afford positioning recording discs around the peripheral surface. A plurality of annular spacing rings are provided which may be positioned around the peripheral surface and between adjacent recording discs. Also the container includes a cover adapted for engagement between the circular end support wall and the top end of the cylindrical portion to form with the base an annular cavity receiving magnetic recording discs positioned around the cylindrical portion, and means adapted for releasably attaching the cover to the base.

Preferably the means for releasably attaching the cover and base together comprises a handle shaped to engage the outer surface of the cover, and cam means adapted for releasable engagement between the handle and a part of the cylindrical portion through a central opening in the cover, and the handle is adapted to be received in a central opening in the bottom support wall in another such shipping and storage container to afford stacking one such container upon another.

BRIEF DESCRIPTION OF THE DRAWING

The invention will be further described with reference to the accompanying drawing wherein like numbers refer to like parts in the several views, and wherein:

FIG. 1 is a vertical front view of a shipping and storage container according to the present invention which has parts broken away to show details;

FIG. 2 is a fragmentary top view of the shipping and storage container of FIG. 1 which has parts broken away to show details;

FIG. 3 is an enlarged fragmentary perspective view of a spacer ring incorporated in the shipping and storage container of FIG. 1; and FIG. 4 is an enlarged perspective view of a handle incorporated in the shipping and storage container of FIG. 1.

DESCRIPTION OF THE PREFERRED EMBODIMENT

Referring now to the drawing, there is shown a shipping and storage container according to the present invention generally designated by the reference numeral 10, which container 10 is adapted to receive and store a plurality of magnetic recording discs 12 of the type used in peripheral equipment for computers and which each comprises an aluminum disc with a central opening and a magnetizable coating on both of its major surfaces.

Briefly, the storage container 10 comprises a base 14 formed of a tough firm polymeric material such as polycarbonate. The base 14 includes an upwardly projecting cylindrical portion 16 having a peripheral surface adapted for close fitting engagement within the central opening of the recording discs 12, and a radially extending circular end wall 18 at a first or bottom end of the cylindrical portion 16 having a raised annular portion adjacent the cylindrical portion 16 adapted to engage the bottom disc 12 around the cylindrical portion in an area closely adjacent its central opening and space its magnetically coated outer portions from the adjacent surface of the end wall 18. A second or top end 20 of the cylindrical portion 16 opposite its bottom end 18 is unrestricted to afford stacking the recording discs around its periphery. A plurality of annular spacing rings 22 are adapted to be positioned around the periphery of the cylindrical portion 16 between adjacent recording discs 12 to provide a desired face-to-face spacing therebetween. Also included in the storage container 10 is a cover 24 which is formed of a tough firm clear polymeric material such as polycarbonate and which comprises a dish-like wall adapted at its center for engagement with the top end 20 of the cylindrical portion, and at its periphery for engagement with the peripheral edge of the end wall 18 to form with the base 14 an annular cavity receiving recording discs 12 positioned around the cylindrical portion 16. Means actuated at a central handle 28 are provided for releasably attaching the cover 24 to the base 14, and the cover 24 and base 14 have portions adapted for engagement to provide an effective dust seal therebetween when the cover 24 is attached to the base 14.

The means for attaching the cover 24 to the base 14 include a lower surface 30 of the handle 28 shaped to engage the upper surface of the cover 24, two spaced loop-like portions 32 of the base 14 projecting upward from a wall 34 transverse of the cylindrical portion 16 adjacent its top end 20, which loop-like portions 32 are adapted to project through appropriately sized and located latch openings 36 in a depressed central portion of the cover 24, and two spaced oppositely extending lugs 38 formed on the handle 28 and adapted to enter the projections 32 via rotation of the handle 28. The top surfaces of the lugs 38 are shaped to engage the lower surfaces of the loop-like portions 32 and pull the handle 28 toward the base 14 and thereby the cover 24 into firm engagement with the base 14 as the lugs 38 are moved into the loop-like portions 32. Each lug 38 is also formed with a transverse rib 40 on its outer side surface adapted to move along the curved inner side surface of the loop-like portion 32 that the lug engages, thereby deflecting the lug 38 slightly toward the center of the handle 28 until the rib 40 passes the edge of the loop-like portion 32 opposite that which it entered, whereupon the lug 38 will move outwardly and the rib 40 will provide a detent to both signal an operator that the container 10 is closed, and to restrict inadvertent rotation of the handle 28 to open the container 10.

The portions of the cover 24 and base 14 adapted for engagement to provide an effective dust seal therebetween when the cover 24 is attached to the base 14 comprise the distal end surface 42 of the cylindrical portion 16 or the adjacent upper surface of the top spacing ring 22 and the adjacent portion of the inner surface of the cover 24 which surfaces are pressed into engagement by the camming action of the handle 28; and spaced upwardly projecting inner and outer flanges 46 and 48 around the periphery of the end wall 18 which are adapted to receive the lower edge portion of the cover 24 therebetween. The inner flange 46 projects substantially above the outer flange 48 (except for spaced areas 50 at which the outer flange 48 is relieved to afford finger access to the edge of the lowermost disc 12 around the cylindrical portion 16) and is shaped so that its upper edge will contact the inner surface of the cover 24 when the lower edge of the cover 24 is adjacent the top edge of the outer flange 48. The outer wall of the cover 24 increases slightly in diameter toward its bottom edge (e.g. five degrees) so that subsequent movement of its lower edge portion further into the slot between the flanges 46 and 48 under the camming influence of the lugs 38 will cause the inner flange 46 to deflect inwardly as it moves along the inner surface of the cover 24, thereby biasing the lower edge of the cover into firm engagement with the continuous outer flange 48 to cause a dust tight seal therebetween.

The spacing rings 22 have an inner diameter adapted for a close sliding fit around the periphery of the cylindrical portion 16, a radial width (e.g. 5/16 to ⅜ inch) adapted so that the ring will not bear against portions of the magnetic coating on the discs 12 in which data will be recorded by peripheral equipment in which they are used, and a thickness (e.g. ⅛ inch) that will not allow the discs 12 to deflect into contact with each other by the impact normally encountered during shipping. The rings 22 preferably are formed of a slightly resiliently compressible polymeric material, such as a vinyl material or polyethylene which allows them to be compressed slightly when the cover 24 is latched in place and thereby to more firmly hold the discs 12. As illustrated, the rings 22 may have grooves formed in their sides to facilitate molding and save material.

The container 10 is adapted to be stacked upon a similar container 10 in that the bottom surface of the base 14 is adapted to rest on the upper surface of the cover 24, and the cylindrical portion 16 of the base 14 has a central opening through the end wall 18 which is adapted to receive the handle 28 of a container 10 on which it is stacked.

OPERATION

To use the container 10, an operator first removes the handle 28 by rotating it to remove the lugs 38 on the handle 28 from the loop-like portions 32 on the base 14, and sets the handle 28 aside. He then removes the cover 24, which he may do by grasping its upper surface with his fingers and pressing the loop-like portions 32 through the openings 36 with his thumbs while lifting the cover 24 away. He then alternately stacks discs 12 and spacing rings 22 around the cylindrical portion 16 of the base 14, and adds any additional spacing rings 22 above the top disc 12 that are needed to bring the top surface of the top spacing ring 22 at least flush with, and preferably slightly above the end surface 42 of the cylindrical portion 16. He then positions the cover 24 over the base with the loop-like portion 32 projecting through the latch openings 36 and its edge portion between the flanges 46 and 48, inserts the ends of the lugs 38 on the handle in the loop-like portions 32, and rotates the handle to fully engage the cam surfaces of the lugs 38 and loop-like portions and thereby press the cover to its fully closed position with its edge portion wedged between the flanges 46 and 48 and its inner surface pressed against the top spacing ring 22 or the end surface 42 of the cylindrical portion.

I claim:

1. A shipping and storage container for a plurality of magnetic recording discs having central openings, said container comprising:
   a base including a cylindrical portion having a peripheral surface adapted for close fitting engagement within the openings of said recording discs and a radially extending circular end wall at a first end of said cylindrical portion, a second end of said cylindrical portion opposite said first end being unrestricted to afford positioning said recording discs around said peripheral surface;
   a plurality of annular spacing rings adapted to be positioned around said peripheral surface and between adjacent recording discs;
   a cover comprising a wall adapted for engagement between said circular end wall and the second end of said cylindrical portion to form with said base an annular cavity receiving recording discs positioned around said cylindrical portion, said cover having a central portion with at least one latch opening positioned adjacent the second end of said cylindrical portion when said cover is in engagement between said circular end wall and the second end of said cylindrical portion; and
   means adapted for releasably attaching said cover to said base comprising a handle shaped to engage the outer surface of said cover, and cam means adapted for releasable engagement between said handle and the second end of said cylindrical portion through said latch opening.

2. A shipping and storage container according to claim 1 wherein said cam means comprises spaced diametrically opposed axial projections from the second end of said cylindrical portion, said projections both having cam surfaces, and spaced projections on said handle having surfaces adapted to engage the cam surfaces on said axial projections upon rotation of said handle around the axis of said cylindrical portion.

3. A shipping and storage container according to claim 2 wherein said circular end wall is adapted to extend radially of said cylindrical portion beyond the perimeter of discs about said cylindrical portion, and has spaced concentric inner and outer flanges at its periphery projecting toward the second end of said cylindrical portion, and said cover wall has an edge portion adapted for engagement between said flanges upon engagement of said cover with said base, said inner flange being adapted to engage and press said edge portion into firm dust-tight engagement with said outer flange upon movement of said edge portion between said flanges.

4. A shipping and storage container for a plurality of magnetic recording discs having central openings, said container comprising:

a base including a cylindrical portion having a peripheral surface adapted for close fitting engagement within the openings of said recording discs and a radially extending circular end wall at a first end of said cylindrical portion adapted to extend radially of said cylindrical portion beyond the perimeter of discs about said cylindrical portion, said circular end wall having spaced concentric inner and outer flanges at its periphery projecting toward the second end of said cylindrical portion, a second end of said cylindrical portion opposite said first end being unrestricted to afford positioning said recording discs around said peripheral surface;

a plurality of annular spacing rings adapted to be positioned around said peripheral surface and between adjacent recording discs;

a cover comprising a wall adapted for engagement between said flanges on said circular end wall and the second end of said cylindrical portion to form with said base an annular cavity receiving recording discs positioned around said cylindrical portion, said cover wall having an edge portion adapted for engagement between said flanges upon engagement of said cover with said base, and said inner flange being adapted to engage and press said edge portion into firm dust-tight engagement with said outer flange upon movement of said edge portion between said flanges; and means adapted for releasably attaching said cover to said base.

* * * * *